(12) United States Patent
Nielsen

(10) Patent No.: US 7,650,797 B2
(45) Date of Patent: Jan. 26, 2010

(54) TUBULAR INSERT FOR A MAGNETIC INDUCTION FLOW METER

(75) Inventor: Søren Nielsen, Sønderborg (DK)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 11/886,093

(22) PCT Filed: Mar. 14, 2005

(86) PCT No.: PCT/EP2005/002704

§ 371 (c)(1),
(2), (4) Date: Jun. 16, 2008

(87) PCT Pub. No.: WO2006/097118

PCT Pub. Date: Sep. 21, 2006

(65) Prior Publication Data

US 2008/0257064 A1    Oct. 23, 2008

(51) Int. Cl.
*G01F 1/58*    (2006.01)
(52) U.S. Cl. .................................................. 73/861.12
(58) Field of Classification Search ............. 73/861.52, 73/861.12, 861.08, 861.11, 861.15; 138/143
See application file for complete search history.

(56) References Cited

U.S. PATENT DOCUMENTS

| | | | | |
|---|---|---|---|---|
| 3,826,087 A | * | 7/1974 | McDonald | 60/200.1 |
| 4,206,638 A | * | 6/1980 | Djorup | 73/170.12 |
| 5,773,723 A | | 6/1998 | Lewis et al. | |
| 6,539,981 B1 | * | 4/2003 | Kleven et al. | 138/143 |
| 6,920,799 B1 | * | 7/2005 | Schulz | 73/861.52 |
| 7,228,748 B2 | * | 6/2007 | Keech et al. | 73/861.12 |

FOREIGN PATENT DOCUMENTS

| | | |
|---|---|---|
| DE | 10046 195 | 4/2002 |
| EP | 0 766 069 A1 | 4/1997 |
| EP | 0 895 066 A1 | 2/1999 |
| JP | 61022216 A | 1/1986 |

\* cited by examiner

*Primary Examiner*—Jewel Thompson

(57) ABSTRACT

There is described a tubular insert for a magnetically inductive flowmeter, a production method for said type of tubular insert and a flowmeter. The tubular insert is made of, essentially, an electrically-insulating material, in particular, rubber, which is reinforced by a tubular molding part made of a dimensionally stable plastic which is based on polymers, at least in a measuring section. The tubular molding part is embedded in the electrically-insulating rubber material by a press or casting method such that the electrically-insulating, rubber material essentially covers the inner surfaces of the tubular molding part. An economical to produce, robust, tubular insert is thus achieved.

10 Claims, 1 Drawing Sheet

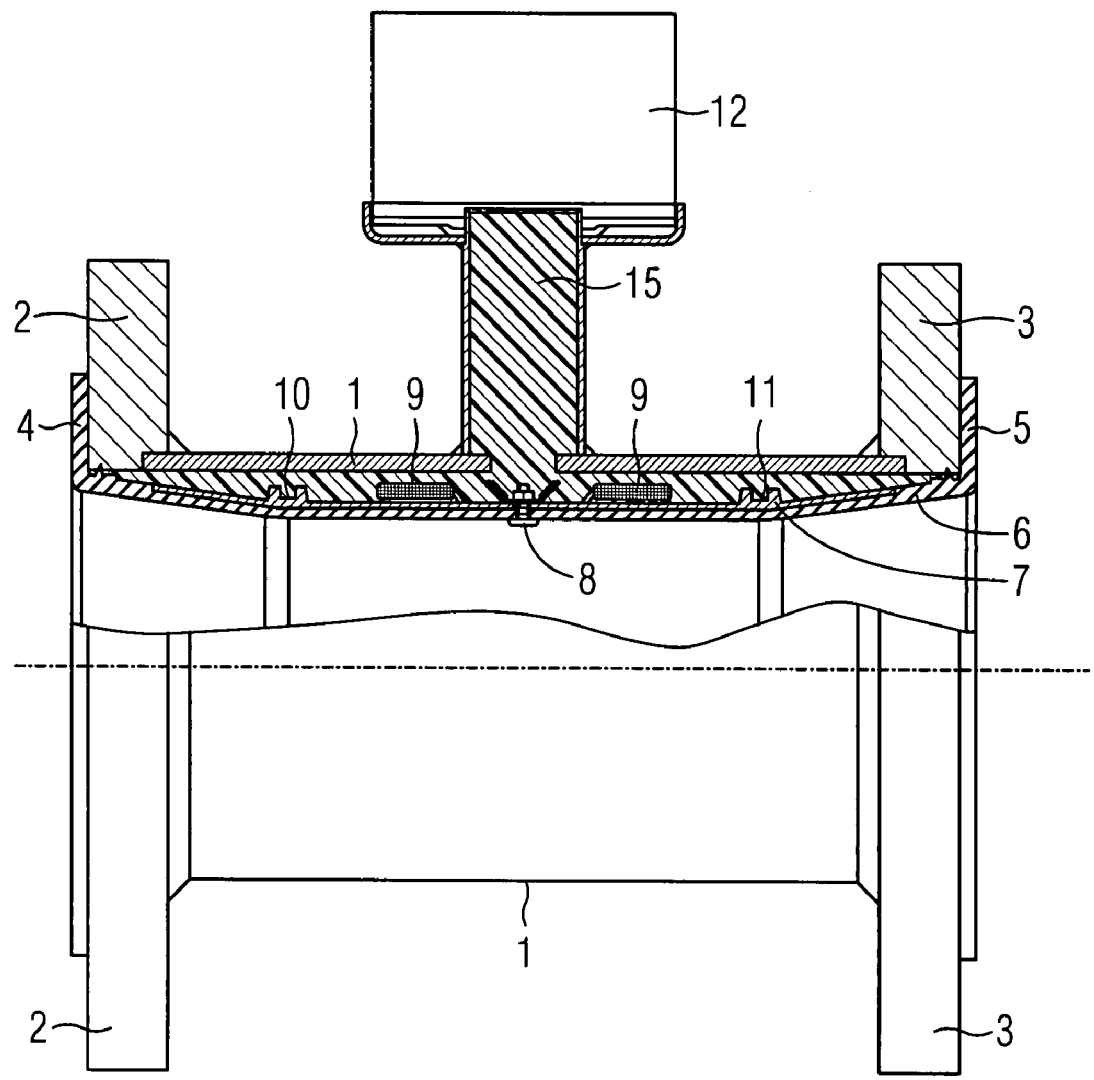

TUBULAR INSERT FOR A MAGNETIC INDUCTION FLOW METER

CROSS REFERENCE TO RELATED APPLICATIONS

This application is the US National Stage of International Application No. PCT/EP2005/002704, filed Mar. 14, 2005 and claims the benefit thereof. The application is incorporated by reference herein in its entirety.

FIELD OF INVENTION

The invention relates to a tubular insert for a magnetic induction flow meter. It also relates to a method for producing a tubular insert of this kind and to a flow meter provided with a tubular insert of this kind.

BACKGROUND OF INVENTION

Magnetic induction flow meters utilize Faraday's law of induction to determine the flow rate of a through-flowing fluid. A magnetic field is generated perpendicular to the direction of flow. In this magnetic field, charges conveyed with the fluid generate, perpendicular to the magnetic field and to the flow-through direction, a voltage which can be picked off using electrodes. The measuring voltage thus identified is proportional to a flow rate based on the cross section of the flow channel. Flow meters of this kind have to maintain largely constant geometric dimensions in order to guarantee measuring accuracy irrespective of the through-flowing fluid pressure prevailing at any time. This pressure resistance is frequently achieved by means of a steel measuring tube through which the fluid flows. However, this measuring tube must not interfere with the electric and magnetic fields which permeate the fluid in the region of a measurement section. For this reason the measuring tube is provided with linings or inserts which are typically made from ceramics or from plastics materials. These meet the requirements of being electrically non-conductive and having virtually no effect on the magnetic field. At the same time they protect the metal wall of the measuring tube against corrosion. Moreover, inserts made from a plastics material have the advantage of being particularly easy to handle.

EP 0 895 066 A1 discloses a tubular insert for a magnetic induction flow meter. This insert is made from an elastomer, preferably synthetic rubber, which acts as the electrically insulating material. To ensure that the measurement section of the tubular insert is less flexible, steel bands are embedded in the rubber in this region. No reinforcement is present in the region of the two end sections. This document gives no indication as to how the steel bands are embedded in the rubber, that is to say, how a reinforced, tubular insert can be produced. The disadvantage of the known insert is that the rubber is not permanently secured to the inner surface of the steel bands and so the geometric dimensions of the tubular insert can vary with fluctuations in pressure.

US patent specification U.S. Pat. No. 5,773,723 discloses a magnetic induction flow meter having a measuring tube, the inner surface of which is lined with perfluoroalkoxy (PFA). This lining is stabilized in a measurement section by means of an embedded metal grid so that the inside diameter of the tube remains constant. The substantially tubular metal grid is formed by twisting a grid strip into a spiral and by welding together the mutually adjoining edges of the grid strip. Welded on the outside of the grid is a plurality of wires which extend in parallel to the tube axis and which are distributed uniformly around the circumference of the tube. The purpose of the wires is to ensure that there is a constant spacing between the inner wall of the measuring tube and the outer surface of the grid. The grid is inserted into the measuring tube and centered there by means of the welded-on wires. At the two end faces the tubular metal grid is welded to the inner surface of the measuring tube. The PFA lining material is inserted between an injection mold that has been inserted into the measuring tube and the inner wall of the measuring tube in an injection molding process, during which the PFA flows through the holes in the metal grid to fill the space between the grid and the inner wall of the measuring tube and to form a layer of constant thickness. One disadvantage of the known lining of a measuring tube is, however, the fact that it is relatively complex to produce. A further disadvantage is the difficulty of molding-on conically extending tube ends when the tubular metal grid is produced from a spirally twisted metal grid strip. Conically extending tube ends of the inside flow channel are, however, frequently provided on magnetic induction flow meters to enable a higher flow rate, and thus better measuring accuracy, to be achieved in the measurement section.

SUMMARY OF INVENTION

An object of the invention is to provide, for a magnetic induction flow meter, a tubular insert which is sturdy when used in a flow meter and which results in a flow meter with long-lastingly good measuring accuracy and relatively low production costs.

To achieve this object, the new tubular insert for a magnetic induction flow meter of the kind referred to in the introduction has the features indicated in an independent claim. A method for producing the tubular insert is described in a further independent claim, and a flow meter having a tubular insert of this kind is described also. Advantageous developments of the invention are indicated in the dependent claims.

One advantage of the invention is that a tubular insert for a magnetic induction flow meter can be prefabricated entirely outside the measuring tube. A molding made from a dimensionally stable polymer-based plastic is already embedded for mechanical reinforcement, which advantageously reduces the cost of producing a flow meter. The tubular insert is, moreover, distinguished by long-term durability and geometric stability as a result of the mechanical reinforcement with the molding made from a dimensionally stable plastic. The electrically insulating, rubber-like material is held in place by means of a stable join at its contact faces with the molding. If necessary, this join can be assisted by the use of an adhesive, which may be a vulcanizing adhesive and is applied to the contact faces. Owing to the structure of the tubular insert there are also fewer constraints in terms of the selection of a suitable electrically insulating, rubber-like material, with the result that the choice can be made from a larger plurality of suitable materials. That is an advantage, since it broadens the possible field of application of a flow meter fitted with a tubular insert of this kind. Flexible electrically insulating materials can also be used, since the geometrical dimensional stability required in the measurement section is reliably achieved by virtue of the mechanical reinforcement with the molding made from a dimensionally stable plastic. It is, moreover, readily possible to provide the molding made from dimensionally stable plastics with a conical shape at its tube ends in a press molding process or casting process. The tubular insert is, moreover, produced in a particularly favorable manner if both the molding made from a dimensionally stable plastic and the electrically insulating, rubber-like material are produced in a press molding process or casting process in the same mold. To this end, the molding is first produced in the same outer mold and then the coating of rubber-like material is applied using a different inner mold.

The use of a molding made from dimensionally stable plastics has an advantage over the known metal reinforcement of an electrically insulating material, in that requirements in respect of the electrical properties of the electrically insulating material are less stringent since the polymer-based plastic is already a good electric insulator. In fact it is not always easy to achieve the electric insulation properties required with a rubber-like material alone. As a result, a larger plurality of rubber-like materials is suitable for use in the new tubular insert. The cost of producing the tubular insert can be further reduced thereby.

Rubber, which has good flexibility, can advantageously be used as the electrically insulating material. If the tubular insert is provided with a fastening flange at each of the two ends and if no reinforcement is embedded at least in one of the two ends, the tubular insert can be easily inserted into a measuring tube of a flow meter despite the flange. Insertion into the measuring tube of the flow meter simply requires the flexible flange to be compressed and guided through the measuring tube. The mechanically reinforced measurement section, which is joined to the flexible flange, is fully inserted into the measuring tube. As soon as the flange has passed through the measuring tube, it can return to its original shape. The insert is then held securely in the measuring tube by means of the two flanges.

Alternatively, a flange-less design of the tubular insert is possible for a steel tube and a magnet arrangement which is secured to the outer surface of the steel tube.

Designing the dimensionally stable molding substantially from glass fiber reinforced PPE/PPO (polyphenylene ether/polyphenylene oxide) and selecting NBR as the rubber-like material have the advantage of obviating the need for adhesive on the contact faces, since the two components react with each other at the interface and thus produce a permanent join. Furthermore NBR (nitrile butadiene rubber) is resistant to many substances, and a flow meter provided therewith can be widely used. EPDM (ethylene propylene diene monomer) rubber is equally suitable.

It has proved particularly advantageous for the glass fiber reinforced PPE/PPO polymer plastic to be in a form having a glass fiber content of between 5% and 10%. In this composition the molding is distinguished by particularly good temperature stability and, at the same time, good fracture resistance.

BRIEF DESCRIPTION OF THE DRAWING

The invention, and also embodiments and advantages, will be explained in more detail in the following, with reference to the drawing, in which an exemplary embodiment is represented.

The single FIGURE shows a magnetic induction flow meter with a partial longitudinal section.

DETAILED DESCRIPTION OF INVENTION

According to the FIGURE, a magnetic induction flow meter has a measuring tube 1 which is provided at both its ends with a flange 2 and with a flange 3 for installation in a pipe. In the upper portion of the FIGURE, the flow meter is shown in a longitudinal section for greater clarity. On the outer surfaces of each of the two fastening flanges 2 and 3 is disposed a flange-like end section, 4 and 5 respectively, of a tubular insert 6. The two end sections 4 and 5 are made from flexible rubber. The tubular insert 6 has four electrodes and two coils in a measurement section, in which the insert is mechanically reinforced by means of a substantially tubular molding 7 made from a glass fiber reinforced PPE/PPO as the dimensionally stable polymer-based plastic. Of these electrodes and coils, only one electrode 8 for reference potential and also one coil 9 are visible in the FIGURE. Continuous grooves 10 and 11 on the molding 7 are provided in order to secure in place electric supply leads which are required for connecting the electrodes and the coils to a control and evaluation unit 12. For the sake of clarity the supply leads are not represented in the FIGURE.

To install the flow meter, first a tubular insert 6, the production of which will be described more precisely later, is fitted with two coils and the electric supply leads. One of the two end sections 4 and 5, for example the end section 4, which has no mechanical reinforcement, is folded together so that it can be inserted through the inside flow channel of the measuring tube 1. As soon as the assembled insert 6 is fully inserted into the measuring tube 1, the end section 4 returns to its original shape, and the insert 6 is held in its position in the measuring tube 1 by the two end sections 4 and 5, which rest against the outer surfaces of the flanges 2 and 3. After the tubular insert 6 has been inserted into the measuring tube 1, the electrodes, for example the electrode 8, are secured through holes located in the measuring tube 1. The hollow spaces remaining between the assembled insert 6 and the measuring tube 1 are filled with a hardenable filling compound 15. As soon as this filling compound has hardened, the insert 6 is stably and fixedly positioned in the measuring tube 1. The insert is also positioned by means of its end sections 4 and 5 which, when the flow meter is installed in a pipe, are squeezed in between the flange 2 and the pipe flange disposed opposite thereto or between the flange 3 and another pipe flange. A grounded shielding plate can be inserted between the magnet coil 9 and the insert 6.

An alternative to the exemplary embodiment represented is a tubular insert for a flange-less flow meter design. The magnetic excitation system can be attached to the outer surface of the steel tube as a further alternative. Apart from the exemplary embodiment described, where rubber is the electrically insulating material, it is alternatively possible to use fluoropolymer or other suitable materials. Depending on the combination of materials used for the tubular insert 6, it may be necessary to use an adhesive on the contact faces on the inner surface of the molding 7 in order to join the molding 7 and the electrically insulating, rubber-like material. Owing to its dimensional stability even when exposed to extremely high temperatures, and its good fracture resistance, glass fiber reinforced PPE/PPO has proved to be a particularly advantageous material for the molding 7. Depending on the tubular insert properties required, another polymer-based plastic can be used instead of this material.

To produce the tubular insert 6, the molding 7 is first prefabricated from a dimensionally stable plastic in a compression mold or casting mold. Then, in a further step the electrically insulating, rubber-like material is applied to the inner surface of the molding 7 in a press molding process or casting process, thus producing the substantially tubular insert 6. If the same mold is used for this, the molding 7 can, for application of the rubber-like material, remain in the outer mold that has already been used for its production.

The invention claimed is:

1. A tubular insert for a magnetic induction flow meter, the tubular insert being prefabricated separately before inserting the tubular insert in a measuring tube of the magnetic induction flow meter, comprising:
   a tubular molding for a mechanical reinforcement at least in a measurement section of the flow meter, wherein the tubular molding comprises a dimensionally stable polymer-based plastic, wherein the tubular molding is embedded in an electrically insulating material, and wherein the insulating material covers an inner surface of the tubular molding.

2. The tubular insert as claimed in claim 1, wherein the electrically insulating material is a rubber-like material.

3. The tubular insert as claimed in claim 1, wherein the electrically insulating material is a fluoropolymer.

4. The tubular insert as claimed in claim 1, further comprising a flange at an end of the tubular insert.

5. The tubular insert as claimed in claim 1, further comprising end sections, wherein at least one end section has a mechanical reinforcement.

6. The tubular insert as claimed in claim 1, wherein the tubular molding comprises glass fiber reinforced polyphenylene ether and polyphenylene oxide.

7. The tubular insert as claimed in claim 5, wherein a glass fiber content is between 5% and 10%.

8. The tubular insert as claimed in claim 1, wherein the electrically insulating material comprises nitrile butadiene rubber or ethylene propylene diene monomer.

9. The tubular insert as claimed in claim 1, wherein the tubular molding is sticked to electrically insulating material by an adhesive.

10. The tubular insert as claimed in claim 1, wherein the adhesive is vulcanized.

* * * * *